June 27, 1933.  J. L. ANDERSON  1,915,913

WELDING METHOD AND APPARATUS THEREFOR

Filed Feb. 20, 1930

INVENTOR
James L. Anderson
BY
ATTORNEY

Patented June 27, 1933

1,915,913

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

WELDING METHOD AND APPARATUS THEREFOR

Application filed February 20, 1930. Serial No. 430,069.

This invention relates to a method of welding sheets or plates by fusion, and to apparatus therefor.

An object of this invention is to make effective use of the heat of gases which would otherwise be freely liberated in connection with the welding operation and which would otherwise be largely wasted or be troublesome, by compelling these gases to surrender as much as possible of their heat to the material being welded, this auxiliary heating being extended over considerable areas of the material. In this way, conduction losses in the work parts are greatly reduced, seam welding can be performed at much greater linear speeds and with economy of the gases or other source of energy supplied to the welder, and a condition favorable to strong and excellent welds is created, since there is a good gradation of heat in the metal adjacent and away from the welding region.

This object is attained by entrapping these gases and distributing them over the surface of the work in numerous parallel streams, by means of channeled parts opposed to the surface of the work and closely adjacent the welder. In a particular execution of the invention these parts serve to hold the work metal in relation for welding, though that is not always necessary. The invention will be described, without limitation, as applied in conjunction with the clamping of plate or sheet material.

The invention is especially useful in welding effected with the oxyacetylene flame in which a large volume of heated and combustible gases issue from the high-temperature flames that fuse or heat the seam edges so that they unite.

In welding together sheets or plates, or the edges of a bent sheet or plate, where they are brought into abutment, or where one sheet end is lapped over another, or where a plate is superimposed over the abutted ends, and the abutted or otherwise contacting parts are to be united, it is often necessary to retain each sheet or plate in suitable relation to the other sheet. For this purpose, it has been customary to clamp each sheet by means of mechanical devices brought down against the body of the metal resting on an underlying support or complementary clamp member.

It is well known that, as the high temperatures used in fusing the contacting surfaces together to produce the weld become effective upon the metal, expansion takes place. If the clamping means be positioned at too great a distance away from the edges or regions to be welded together, the expansive stresses during heating will act to buckle or bow at least one of the sheets, while the contractive stresses, during cooling and congelation, have been known to tear the freshly interfused metal apart. In cases where the sheets are positioned in abutting relation, the expansive stresses may force the edges together until they slide over each other and thus come into an undesired lapping position. This is especially true where an open space is presented below the edges to be welded, so that the sheet edges are free to move downward, as well as upward, one edge then being free to move down into the space while the other springs over it into lapping position. In other instances both edges may be bowed downward, with unsatisfactory results.

It is therefore important to locate the clamping means as close to the point at which the weld is to be produced as possible in order to retain the edges in substantially immovable relation, and also, if possible, to support the seam edges, in the case of butt welding, to prevent their downward movement. By such location of the clamps, the amount of metal between clamps affected by the heat is reduced and the expansive stresses arising from heating will act to produce an upset weld rather than to bend, bow or otherwise distort the finally welded sheet. For many purposes an upset or thickened weld is desirable. If a substantially smooth weld is desired, the clamping pressure might be made less, to allow the metal to expand or slip beneath or through the clamps.

When the clamps are located in proximity to the welding point, a number of deterrents to efficient welding are encountered. The relatively cold mass of metal of the clamps naturally acts to extract heat from the sheet or plate clamped and thereby from the edges or surfaces to be fused together. Where oxy-fuel gas apparatus, combustible-gas-sheathed arcs, or like devices requiring supplies of air for their efficient operation, are used for producing the welding temperatures, the access of air to the welding flame is limited by the smallness of the space left free between the clamps, so that complete combustion of these gases close to the welding point is not realized, resulting in great loss of effective portions of the gas which might be used to assist in the welding operation. These combustible gases rise away from the welding point and burn at a considerable distance therefrom, heating the torch body as well as the upper portions of the clamping mechanism. Rather than to assist the operation, the so-called envelope gases thus become undesirable deterrent factors.

It is an object of this invention to arrange the metal sheets or plates for the welding operation and to so hold them in fixed position for this operation that the clamps may be located in close proximity to the edges or surfaces to be welded, yet the heat loss through the clamps will be minimized, and the hot gases, either those in the vicinity of the welding apparatus and heated thereby, or conducted to, or produced at, the welding point by the welding apparatus, and the unused heat normally dissipated from the welding means, will be utilized for preheating the metal in advance of the portion being welded.

In apparatus embodying the invention, in the case of oxy-fuel gas apparatus or combustible-gas-sheathed arcs, the highly inflammable envelope gases, that is to say, unconsumed gases, while at the high temperature of combustion after attacking the metal to be fused, or, in other methods of thermal welding, where there results, from the action of the high temperature producing means, a body of hot gases, such hot gases are conducted along the surface of the sheets or plates to be welded, and also along the gripping surface of the clamps. Due to the heat transfer effected between such hot gases and the metallic sheet, the temperature of the body of the sheet or plate is increased so that, at the time fusion takes place, a lower temperature differential between the fused metal and the body of the sheet or plate will exit. Fusion will therefore require less heat input, will occur more quickly, and result in a more regular gradation of temperature through the sheet body, effecting a weld which will be of great strength due to its graded integration with the metal body. Heating by these gases also counteracts any tendency of the clamps to extract heat from the metal body as the clamping surfaces will be heated by the gases sufficiently to minimize their heat absorption.

For this purpose the ordinary smooth surfaced clamp is replaced by a clamp the surface of which is provided with a plurality of grooves between ribs formed on the gripping surface of the clamp. The ribs are adapted to be brought into direct engagement with the metal of the sheet or plate to be welded while the grooves provide passageways between the clamp and the metallic body for carrying the hot envelope gases away from the point of welding along the surface of sheet and clamp. The ribs may be, and preferably are, disposed in parallel relation to effect uniform clamping action upon the portion to be secured in position and to distribute heat from the envelope gases uniformly over the surface of the portion and of the clamping surface. However, this may be varied.

The ribs may extend perpendicular to the line of welding, or may be otherwise angularly disposed relative thereto. Preferably the disposition of these ribs is such that the gases will be guided along the sheet in advance of the welding position, thereby preheating the metal at the seam edges and also heating the metal for a considerable distance on each side of the portions to be welded in order to reduce the temperature differential between the body of the metal and the edges to be fused together.

In place of the customary space below the seam to be welded, a plurality of spaced ribs are preferably there positioned, these ribs being spaced sufficiently and being of sufficiently small contact surface area so that the heat abstracting surfaces thereof at the seam will be reduced or will be negligible. The arrangement of these lower ribs with respect to the ribs of the movable or upper clamp surface is such that substantially only a plurality of point contacts will be created by their crossing, these points at which greater quantities of heat are extracted than at other points in the sheet being located and uniformly distributed at a considerable distance away from the portion to be fused so that their effect upon the fusing metal will be practically negative. Where the lower ribs cross beneath the line of fusion, their area of contact is of a low order and will not appreciably affect the efficiency of welding.

As welding proceeds and the edges approach each other, due to expansion of the metal in butt welding, in the manner above described, the lower ribs will resist any downward movement while the upper ribs, positioned closely adjacent the weld line, will hold the metal rigidly against other movement.

Other objects of this invention will be pointed out in or will be obvious from the description of the means for effecting the invention as hereinafter set forth.

On the drawing, in which is illustrated an embodiment of apparatus for effecting the invention:

Figure 1:
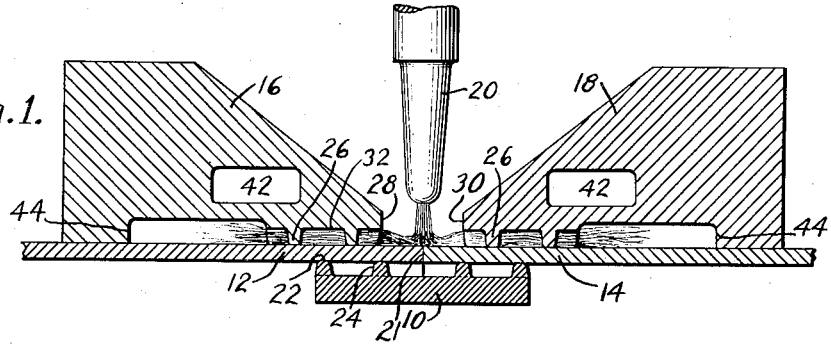
Fig. 1 is a cross-section taken on the line 1—1 of Fig. 2.

In the embodiment for carrying out the principles of this invention as shown on the drawing there is disclosed a base plate 10, upon which are to be positioned the ends 12 and 14 of sheet or plate metal, which are to be held rigidly in abutting relation by means of jaws 16 and 18, bearing downwardly against the sheets and the base plate. An oxy-fuel gas welding torch or other suitable high temperature creating means 20 may be supported in any well known manner, and is fed along the seam 21 presented by the abutted edges. The particular type of welding device or the method of welding may be varied. In the disclosure herein, the retention of sheet ends in abutted relation only is considered. However, the invention may also be applied to the retention of edges in lapped relation, as will be apparent to those skilled in the art.

Figure 2:
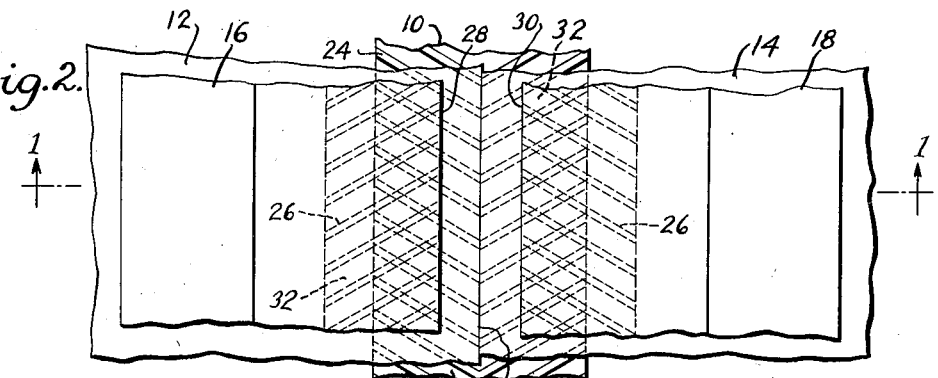
Fig. 2 is a fragmentary plan view of one form of clamping means embodying the invention.
Figure 3:
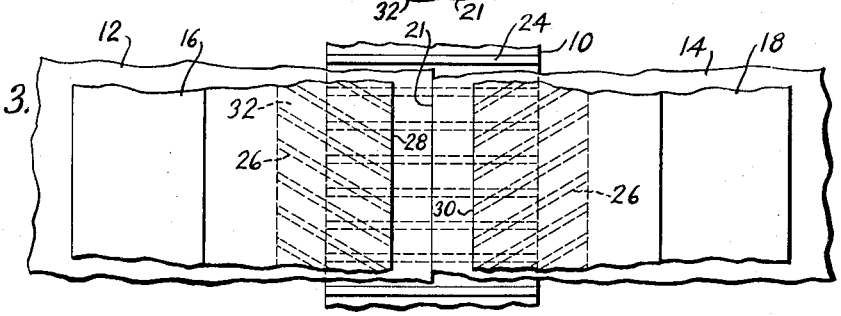
Fig. 3 is a fragmentary plan view illustrating a modification.

The supporting face 22 of plate 10, constituting the lower clamp member, upon which the sheet ends are positioned, is formed with a plurality of ribs 24, preferably spaced apart at equal intervals and crossing the line of the seam formed by the abutment of the two sheet ends. The ribs are desirably positioned in parallel relationship and may extend across the line of the seam at any preferred angle thereto. Figs. 2 and 3 show two ways of positioning these ribs. The constructions of Figs. 2 and 3 differ only in the angularity of the ribs 24. The straight rib of Fig. 3 is easier to manufacture but presents less common contacting area in combination with the ribs on the jaw faces, described hereinafter. The channels between the ribs of this part receive gases that pass through the seam cleft and conduct these gases in heating contact with the under surfaces of the sheet or plate material being welded.

The bottom faces of the jaws or upper clamp members 16 and 18 are formed with a plurality of ribs 26 in that portion of each jaw which normally is brought into engagement with the sheet end to hold it in position. The ribs of each jaw are equidistantly spaced and positioned parallel to each other, as are ribs 24 on face 22. In the case of ribs 26, however, it is preferred that the disposition be such that, if they were extended, they would cross the line of the seam at an acute angle thereto, as seen in Figs. 2 and 3. Further, the angle at which the ribs of the separate jaws, so extended, would meet the seam would be equal but opposite, as shown in these views. The specific design, however, is not essential.

While the exact angle of divergence of the two sets of ribs is not a material part of this invention, nor is it necessary to effect the end of efficient clamping of the edges in close proximity to the line of the seam that the ribs should so diverge, yet it is preferable to diverge the ribs in the direction of travel of the torch 20. By so arranging the ribs, the hot gases emitted, created, or otherwise heated by, or in the vicinity of, the torch or like means, used for effecting the weld, and normally baffled and driven upwardly by the jaw faces 28 and 30 against the torch or like device are guided through the grooves 32 between the ribs and away from these jaw faces and the welding device. The gases are thus conducted over the face of the sheets in advance of the point at which the weld is being made. Heat interchange between the hot gases and the sheet occurs; the temperature difference throughout the sheet and especially adjacent the sheet edges is made less marked in its gradation; effective preheating of the seam edges is accomplished, and more efficient and more rapid welding is made possible. In addition thereto, the gases heat the portions of the jaws which are in contact with the sheet metal; with increase of the temperature of these parts, a decrease in the difference of temperature between sheet and clamping metal is effected and the rate of heat interchange is measurably reduced.

Also, the ribbed construction of the jaw face reduces the actual jaw metal in heat extracting proximity to the sheet. The loss of heat through this avenue having been reduced by decreasing its area and increasing its temperature, in the manner set forth, the effective portions of the jaws adjacent the abutted edges at which the weld is made may be moved closer thereto without reducing the efficiency of the welding operation.

Figure 4:
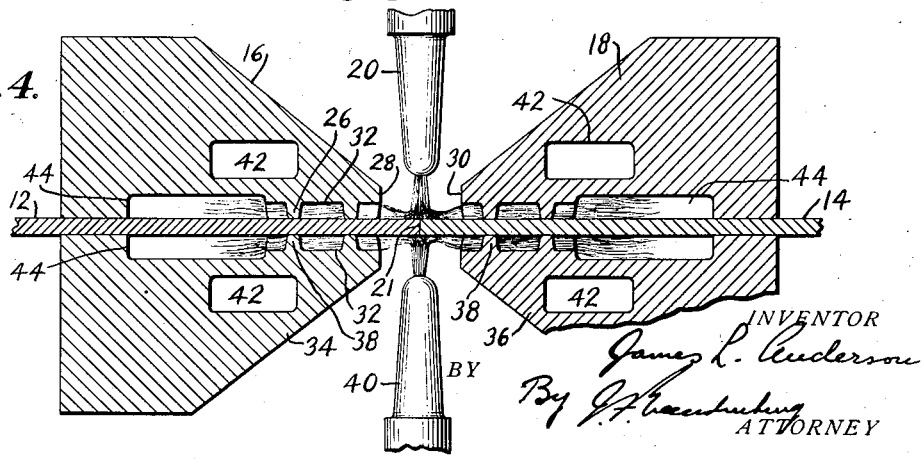
Fig. 4 is a cross-section of a form of the apparatus suitable for use when the welding is done from both sides.

In the embodiment of the invention shown in Fig. 1, base plate 10 is used in conjunction with jaws 16 and 18. However, when heavy sheet metal or plate is to be welded together, base plate 10 may be replaced, as seen in Fig. 4, by a pair of jaws 34 and 36, similar to jaws 16 and 18. In such case, jaws 34 and 36 would be formed with sets of divergent ribs 38, similar to ribs 26, to guide the hot gases from the vicinity of a torch or like welding device 40, positioned beneath and moved along the seam in cooperation with a torch above the seam, as in Patents 1,084,692, dated January 20, 1914, and 1,091,479, dated March 31, 1914.

In Figs. 2 and 3, ribs 24 are seen to be disposed to cross the lines of the ribs of jaws 16 and 18 at a plurality of separated points.

The number of such points would, of necessity, be determined by the angularity and spacing of the ribs, which in turn would be functions of the crushing strength rather than the shearing strength of the metal. In thin sheet metal this distinction is obviously important. However, where heavy sheet or plate is handled, it is not necessary that the lines of the ribs intersect as the clamping pressure will not be sufficient to approximate the shearing or bending strength of the metal, even if the ribs be parallel but not position in directly superimposed relation. Where that is true, the opposed ribs may if desired be parallel, as, for example, when the jaws 16 and 18 are opposed to the jaws 34 and 36, and no special provision is made for aligning the ribs on pairs of jaws.

Where the base plate 10 and ribs 24 are used, the ribs cross the point at which the weld is to be produced. Due to the small surface of contact with which such ribs are designed, the amount of heat extracted by the metal of the ribs will be negligible. However, downward deflection of the opposed sheet edges will be prevented by the ribs 24, which together with the adjacent jaw ribs will act to fix the sheet edges against any movement in any direction except upwardly. Such upward movement may occur after the welding device has passed any particular point and the contractive stresses become active, pulling the metal through the clamps and raising the welded seam slightly away from ribs 24. Such movement is desirable, rather than otherwise, as it removes the still hot metal from direct contact with the heat-removing areas of ribs 24 and permits uniform cooling of the welded seam.

Since ribs 26 add to the heat-absorbing areas of the jaws and since the jaw faces are heated by the gases conducted along said ribs, the jaws are preferably provided with some heat-absorbing means to prevent burning of the metal thereof. For this purpose conduits 42 are formed in the bodies of the jaws for the passage therethrough of cooling fluids.

The gases, after their passage through and discharge from grooves 32, are commingled in a common flue 44, where they continue to heat the metal and from which they may be led to any desired discharge point.

I claim:

1. In apparatus for welding sheet or plate metal, means for retaining a pair of edges of such material in welding position, said means being constructed to engage the metal adjacent said edges at only a plurality of spaced apart areas of relatively small extent, and means for directing a high temperature source at said edges to fuse them together, retaining means being constructed to guide said gases from said source in a series of separated streams along the surface of the metal to preheat the metal in advance of the position at which said edges are being fused.

2. In apparatus for welding sheet or plate metal, means for retaining a pair of edges of such material in welding position, said means being constructed to engage the metal adjacent said edges at only a plurality of spaced apart areas of relatively small extent, and means for directing a high temperature source at said edges to fuse them together, said retaining means being provided with a series of parallel channels to guide gases from said source along the surface of the metal to reduce the loss of heat by conduction from said edges through the metal.

3. Welding apparatus comprising clamping means for retaining metal edges in position to be welded, and a hot gas emitting device for fusing said edges together to integrally bond them together, said clamping means including a plurality of jaws, the faces of which are formed with a series of channels adapted to guide the gases from said device along the metal and forwardly of said device to preheat the metal and to reduce loss by conduction through said metal away from said edges.

4. In apparatus for welding sheet or plate metal, means for retaining a pair of edges of such material in welding position, said means being constructed to engage the metal adjacent said edges at only a plurality of spaced apart areas of relatively small extent, and a heat emitting device creating hot gases at said edges for fusing them together, said retaining means being provided with a plurality of divergent channels to guide said gases along the surface of the metal to preheat the metal in advance of the position at which said edges are being fused.

5. Welding apparatus comprising clamping means for retaining metal edges in position to be welded, and a hot gas emitting device for fusing said edges to integrally bond them together, said clamping means consisting of a plurality of jaws, the faces of which are formed with a plurality of spaced apart ribs providing channels to guide the gases from said device along the metal away from said edges to reduce loss by conduction through said metal away from said edges.

6. Welding apparatus comprising clamping means for retaining metal edges in position to be welded, and a hot gas emitting device for fusing said edges to integrally bond them together, said clamping means consisting of a plurality of jaws, the faces of which are formed with a plurality of spaced apart ribs providing channels to guide the gases from said device along the metal, away from said edges and forwardly of said device to reduce loss by conduction through said metal away from said edges.

7. Welding apparatus comprising clamping means for retaining metal edges in position to be welded, and a hot gas emitting device for fusing said edges to integrally bond them together, said clamping means consisting of a plurality of jaws, the faces of which are formed with a plurality of parallel spaced apart ribs to grip the metal and to provide gas conducting channels, the ribs on jaws engaging the same relative surface of the metallic sheets being disposed in divergent relation in the direction away from the point of application of said device.

8. A method of welding together sheets or plates disposed with the lateral edges thereof in proximate relation which consists of: holding each sheet in position by engaging it adjacent the said lateral edges but only at a plurality of individually isolated areas, and then heating the lateral edges to fusion by a hot gas producing device while conducting the hot gases from said device away from the edges and divergently along the sheets and through the means for holding the sheets in position.

9. In apparatus for welding together sheet or plate members, positioned in edge to edge abutting relation, an under part presenting a surface for supporting the members, when so abutted, said surface having a plurality of ribs projecting therefrom to carry said members, said ribs engaging the members immediately at the abutted portions thereof and extending transversely of the line of the seam, means for fusing the abutted portions together, and means for retaining the members in assembled relation on said surface, the retaining means being formed to conduct hot gases away from the neighborhood at which the portions are being fused and over the surfaces of the members.

10. Welding apparatus comprising clamping means for retaining metal edges in position to be welded, and a heating device producing hot gases for fusing said edges together to integrally bond them together, said clamping means including a plurality of jaws, the faces of which are formed to guide the gases from said device along the metal, away from said edges and forwardly of said device to reduce the loss by conduction through said metal away from said edges, the jaw on the side opposite to the heating device being positioned directly below and in contact with the edges with its ribs crossing contact with the edges with its ribs on the same side as said edges, and the jaws on the same side as the heating device being spaced equi-distant on either side of said edges and being provided with ribs divergent forwardly of said heating device.

11. Welding apparatus comprising clamping means for retaining metal edges in position to be welded, and a heating device producing hot gases for fusing said edges together to integrally bond them together, said clamping means including a plurality of spaced apart ribs providing channels to guide the gases from said device along the metal to reduce loss by conduction through said metal away from said edges, and also including three jaw members, one directly below the edges with its ribs at right angles to the edges and the others on the same side as said device spaced on either side of said edges with their ribs divergent forwardly of said device.

12. Welding apparatus comprising clamping means for retaining metal edges in position to be welded, and a heating device producing hot gases for fusing said edges together to integrally bond them together, said clamping means including a plurality of jaws, the faces of which are formed with a plurality of spaced apart ribs providing channels to guide the gases from said device along the metal and forwardly of said device to reduce loss by conduction through said metal away from said edges, the ribs on said jaws on the same side of said edges being parallel to each other.

13. In apparatus for progressively welding a seam in sheet or plate material by means of a hot gas emitting device capable of bringing the seam edges to fusion, parts opposed to the surface of the sheet or plate material and closely approaching the welding device and the line of the seam, the surfaces of said parts opposed to the sheet or plate material being formed with a series of channels adapted to confine the hot waste gases and to conduct the same over the surface of the material, whereby said gases are effectively utilized by compelling them to surrender heat to the material over relatively large areas.

14. In apparatus for progressively welding a seam in sheet or plate material by means of a hot gas emitting device capable of bringing the seam edges to fusion, parts opposed to the surface of the sheet or plate material and closely approaching the welding device and the line of the seam, the surfaces of said parts opposed to the sheet or plate material being formed with a series of channels adapted to confine the hot waste gases and to conduct the same over the surface of the material, whereby said gases are effectively utilized by compelling them to surrender heat to the material over relatively large areas, said channels extending obliquely with relation to the line of the seam.

15. In apparatus for progressively welding a seam in sheet or plate material by means of a hot gas emitting device capable of bringing the seam edges to fusion, parts opposed to the surface of the sheet or plate material and closely approaching the welding device and the line of the seam, the surfaces of said parts opposed to the sheet or plate material being formed with a series of channels adapted to confine the hot waste gases and to conduct the same over the surface of the material, whereby said gases are effectively utilized by compelling them to surrender heat to the material over relatively large areas, said channels being disposed to guide the gases away from the seam and forwardly to aid in preheating the metal before it is welded.

16. In apparatus for progressively welding a seam in sheet or plate material, the combination with an oxy-fuel gas torch for delivering a high temperature flame to bring the seam edges to fusion, of means opposed to the surface of the sheet or plate material and closely approaching the torch and the line of the seam, the surface of said means opposed to the sheet or plate material being formed with numerous parallel channels adapted to confine the hot gases emitted from the flame and to conduct the same over the surface of the material in order to compel said gases to surrender the maximum amount of heat to the material as they flow away from the welding region.

17. In apparatus for progressively welding a seam in sheet or plate material by means of a hot gas emitting device capable of bringing the seam edges to fusion, parts opposed to the surface of the sheet or plate material and closely approaching the welding device and the line of the seam, the surfaces of said parts opposed to the sheet or plate material being formed with a series of channels adapted to confine the hot waste gases and to conduct the same over the surface of the material, whereby said gases are effectively utilized by compelling them to surrender heat to the material over relatively large areas, together with another part opposed to the surface of the material away from the welding device, this part extending across the line of the seam and being likewise provided with gas-conducting channels in its surface next the material.

18. In apparatus for progressively welding a seam in sheet or plate material, means for effectively utilizing the heat of waste welding gases comprising parts opposed to both surfaces of the material and approaching but spaced from the line of the seam so that welding torches can act upon the seam both above and below, said parts being provided in their surfaces next the material with numerous parallel channels for conducting hot waste gases from the welding devices away from the welding region and in close confinement to the upper and lower surfaces of the material.

19. In apparatus for progressively welding a seam in sheet or plate material by means of a hot gas emitting device capable of bringing the seam edges to fusion, means for utilizing gases that would otherwise go to waste, said means comprising parts closely opposed to relatively large areas of the sheet or plate material and having numerous parallel channels disposed to conduct hot gases from the region of the seam over the surface of the material away from the seam, said parts being further provided with common flues into which said channels deliver the gases.

20. A method of welding a seam in sheet or plate material, which comprises bringing the edges of the seam to fusion by means of a fusion welder, and entrapping the hot gases that would otherwise be freely liberated and conducting them in numerous parallel streams over the surfaces of the sheet or plate material, in order to accomplish wide and effective heating of the material by these gases.

JAMES L. ANDERSON.